No. 740,436. PATENTED OCT. 6, 1903.
O. E. HUNT.
AUTOMATIC ATTACHMENT FOR EAVES TROUGH CUT-OFFS.
APPLICATION FILED JULY 10, 1903.
NO MODEL.

Witnesses
R. A. Boswell
A. L. Hough

Inventor
Olin E. Hunt,
By Franklin H. Hough
Attorney

No. 740,436.

Patented October 6, 1903.

UNITED STATES PATENT OFFICE.

OLIN ELMER HUNT, OF EUREKA, KANSAS.

AUTOMATIC ATTACHMENT FOR EAVES-TROUGH CUT-OFFS.

SPECIFICATION forming part of Letters Patent No. 740,436, dated October 6, 1903.

Application filed July 10, 1903. Serial No. 164,973. (No model.)

*To all whom it may concern:*

Be it known that I, OLIN ELMER HUNT, a citizen of the United States, residing at Eureka, in the county of Greenwood and State of Kansas, have invented certain new and useful Improvements in Automatic Attachments for Eaves-Trough Cut-Offs; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in automatic eaves-trough cut-offs; and it consists in the provision of means whereby a weighted member is connected to a tripping mechanism whereby when a certain amount of water has fallen in a bucket comprising the weighted member the tripping mechanism may be actuated to release a spring-actuated cut-off which will cut off the supply leading to the bucket and open communication to a duct in the trough, whereby water may pass to any suitable location.

The invention consists, further, in various details of construction and combinations and arrangements of parts, which will be hereinafter fully described, and then specifically defined in the appended claim.

My invention is illustrated in the accompanying drawings, in which—

Figure 1:
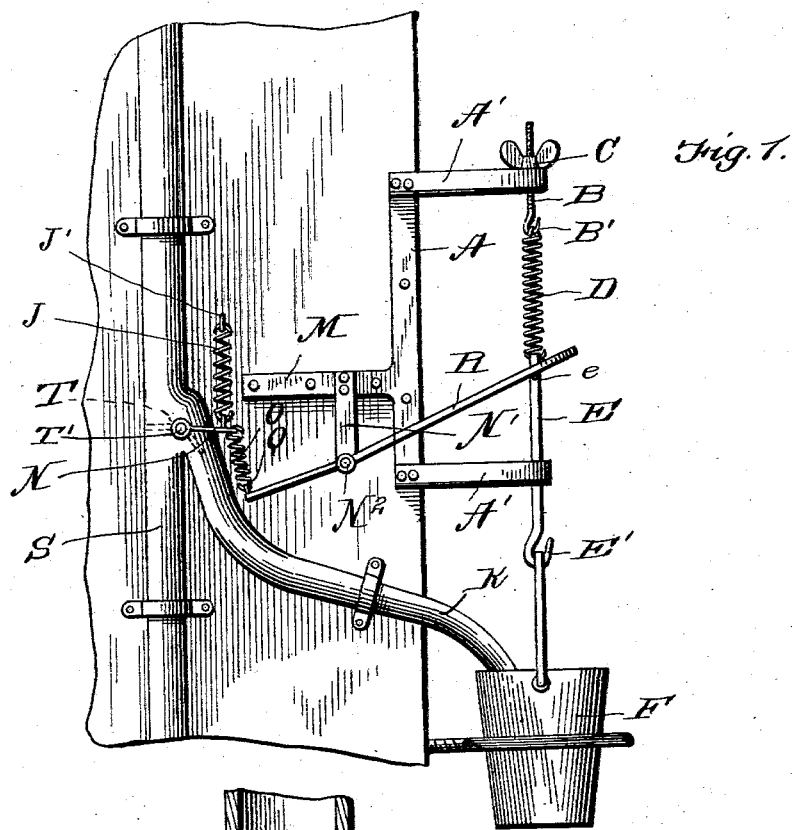
Figure 2:
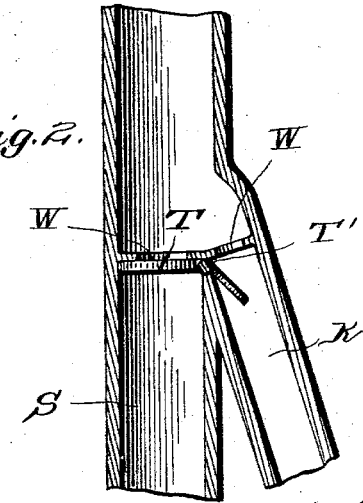

Figure 1 is a side elevation of my improved apparatus shown as applied to an eaves-trough. Fig. 2 is a sectional view showing the cut-off mechanism and the manner of operating the same.

Reference now being had to the details of the drawings by letter, A designates a frame which is adapted for attachment to the side of a house, being bolted or otherwise secured thereto, and has horizontally-projecting arms A', and B designates a rod which has a hook B' at its lower end, and the shank portion of said rod B passes through an aperture in one of said horizontally-extended arms A', and a winged nut C is mounted upon the threaded portion of said rod, whereby the latter may be raised and lowered. A spring D is connected at one end to the hooked portion of said rod, and its other end is fastened to a rod E, which passes through an aperture in the lower horizontally-disposed arm A' of said frame and has a hook E' at its lower end, adapted to engage the bail of a bucket F. A hoop H surrounds said bucket and holds the same underneath the spout K of the eaves-trough. A bracket-arm N' extends downward from an arm N of the frame and carries a pin $N^2$, on which is pivotally mounted a lever R, which is normally held in the position shown in Fig. 1 of the drawings when the bucket is empty by means of a pin $e$.

S designates a down-spout from which the pipe K branches, and T is a valve pivotally mounted upon a pin T', and an arm N is connected to said pin, as shown in Fig. 1. A spring O is connected at one end to said arm N, and its other end is connected to an eye Q on one end of the lever R, while a second spring J is fastened at one end to an eye J', and its other end is fastened to an eye carried by the arm N. Said valve, as will be seen in Fig. 2, is double to control the two apertures W and W', the former communicating through the down-spout, while the other opens through the partition leading into the branching pipe K.

The operation of the apparatus is as follows: Supposing the valve in the main portion of the down-spout to be closed, water coming down will pass through the branching pipe, and as the bucket becomes filled the weight of the same will pull down on the rod E and the spring J will cause the valve T to tilt upon its pivot-pin, closing the aperture W' and opening the passage-way which leads through the down-spout proper. The valves will be held so as to close the passage-way in the branching pipe until the weight is relieved from the rod E, after which the rod E will return to its starting position and with it the lever R, thus reversing the valve.

While I have shown a particular construction of apparatus embodying the features of my invention, it will be understood that I may make alterations in the details of construction, if desired, without departing from the spirit of the invention.

Having thus fully described my invention, what I claim as new, and desire to secure by Letters Patent, is—

An attachment for down-spouts, comprising, in combination with the down-spout and branching pipe, a valve therein controlling the passage through the main and branching pipe, a frame having arms projecting therefrom, an adjustable screw held by one of said arms, a spring connected to said hook, a rod to which the other end of said spring is connected and a hook at its other end, a bail engaging the hook at the lower end of said rod, a lever pivoted to said frame, a spring connecting the arm of said valve with one end of said lever, a second spring fixed at one end to a stationary object and its other end connected to an arm of the valve, and a pin carried by said rod and adapted to engage the under face of said lever, as set forth.

In testimony whereof I hereunto affix my signature in presence of two witnesses.

OLIN ELMER HUNT.

Witnesses:
GEORGE MANSFIELD,
BESS B. WRENCH.